United States Patent [19]

Martin et al.

[11] 4,030,591

[45] June 21, 1977

[54] CONTROLS FOR A MOVABLE DISK PRINTER

[75] Inventors: Blair Robertson Martin, Owego; Johann Hans Meier, Vestal; Jerry Wesley Raider, Endicott, all of N.Y.

[73] Assignee: International Business Machines Corporation, Armonk, N.Y.

[22] Filed: Sept. 25, 1975

[21] Appl. No.: 616,803

[52] U.S. Cl. .................. 197/53; 197/6.6; 197/18
[51] Int. Cl.² .......................................... B41J 1/32
[58] Field of Search ............... 197/18, 48–54, 197/6.6, 6.7; 178/34, 33; 318/685

[56] References Cited

UNITED STATES PATENTS

| | | | |
|---|---|---|---|
| 3,227,258 | 1/1966 | Pannier et al. | 197/6.6 |
| 3,282,389 | 11/1966 | Rudisch et al. | 197/6.6 |
| 3,789,971 | 2/1974 | Deyesso et al. | 197/18 |
| 3,884,339 | 5/1975 | Castoldi et al. | 197/53 X |
| 3,908,809 | 9/1975 | Beattie | 197/18 |
| 3,924,721 | 12/1975 | Reynolds | 197/18 |

*Primary Examiner*—Ralph T. Rader
*Attorney, Agent, or Firm*—Elmer W. Galbi

[57] ABSTRACT

A rotatable print disk is mounted on a carrier which traverses along the print line. The disk is moved from each character position to the next by the shortest distance and it is stopped at the time of printing. The carrier is moved from one print position to the next at a speed which is selected depending on the time required for the disk to rotate to the next character. Printing takes place with the carrier moving at one of a number of speeds. Hammer firing is timed dependent on printing speed.

2 Claims, 14 Drawing Figures

| UNITS OF DISK ROTATION | SPEED OF CARRIER | | |
|---|---|---|---|
| | CHARACTER FOLLOWED BY CHARACTER | CHARACTER FOLLOWED BY 1 SPACE | SPACE FOLLOWED BY MOVE FROM 1 SPACE |
| 1<br>2<br>3<br>4<br>5<br>6<br>7<br>8<br>9<br>10<br>11<br>12<br>13<br>14<br>15<br>⋮<br>43<br>44<br>45<br>46<br>47<br>48 | V4<br>V3<br>V2<br>V1<br>V1 TO 0 TO V1 | V4<br>V3<br>V2 | V4 |

FIG. 7

| UNIT OF DISK MOTION | CARRIER SPEED CHANGES | TIMING NUMBERS |
|---|---|---|
| | 0 TO V1 | N1 TO N4 |
| | V1 TO 0 | N5 TO N6 |
| | V1 TO V2 | N7 TO N12 |
| | V2 TO V1 | N13 TO N18 |
| | V2 TO V3 | N19 TO N24 |
| | V3 TO V2 | |
| | V3 TO V4 | |
| | V4 TO V3 | |
| | V1 TO 0 TO V1 | |
| | V1 TO V3 | |
| | V1 TO V4 | |
| | V2 TO V4 | |
| | V4 TO V2 | |
| | V4 TO V1 | |
| | V3 TO V1 | N79 TO N84 |
| | V1 TO V1 | N1263 TO N1268 |
| | V2 TO V2 | N1269 TO N1274 |
| | V3 TO V3 | N1275 TO N1280 |
| | V4 TO V4 | N1281 TO N1286 |
| 1 | | N85 TO N87 |
| 2 | | N88 TO N89 |
| 3 | | N90 TO N92 |
| 4 | | N93 TO N96 |
| 5 | | |
| 6 | | |
| 7 | | |
| 8 | | |
| 9 | | |
| ⋮ | | ⋮ |
| 46 | | |
| 47 | | |
| 48 | | N1214 TO N1262 |

FIG. 8

| DATUM 1 | DATUM 2 | DATUM 3 |
|---|---|---|

↑ MOVE A    ↑ MOVE B

CONTROLS FOR A MOVABLE DISK PRINTER

DESCRIPTION OF THE PRIOR ART

Printers which utilize a rotating disk with characters on the periphery thereof are well known. Several such printers are commercially available. Rotating disk printers can be divided in categories by either focusing on how the disk rotates or by focusing on how the carrier traverses.

Focusing on how the disk rotates, such printers can be divided into a first category where the disk constantly rotates and into a second category where the motion of the disk is intermittent. In printers with a constantly rotating disk, printing takes place when the hammer strikes the rotating disk. Rotation of the disk is not stopped each time a character is printed. In printers with a disk that intermittently rotates, the disk is rotated to the desired print position and then stopped. There is no disk rotation while printing takes place.

An alternate division of disk printers can be made by focusing upon the motion of the carrier. In some printers, the traverse of the carrier is stopped each time printing takes place. In other printers the carrier is moving at the instant when printing occurs. In both the type where the carrier is moving when printing occurs and in the type where the carrier is stopped when printing occurs, the disk may or may not be rotating at the time of printing. In some printers where the carrier is moving at a fixed speed when printing takes place, the carrier is slowed down and stopped between print positions in order to give the rotating disk time to move to the desired character.

The following are some of the issued and pending patents which show rotating disk printers:

The Willcox U.S. Pat. No. 3,461,235 shows a disk printer with a constantly rotating disk. The carrier stops at each print position.

The Ponzano U.S. Pat. No. 3,707,214, which issued on Dec. 26, 1972, discloses a disk printer which has separate controls for a print wheel and its carrier. The print wheel and the carrier move by the shortest distance at the next selected position. The print wheel and the carrier stop at each print position.

The Robinson U.S. Pat. No. 3,356,199, which issued on Dec. 5, 1967, describes a rotating disk printer wherein the disk is constantly rotating. The type elements on the disk are in a particular spiral configuration. The carrier also moves at a constant speed which is synchronized with the motion of the disk in such a manner that the desired character can be printed in each print position.

The Giani U.S. Pat. No. 3,742,845, which issued on July 3, 1973, shows in FIG. 11 a drum printer which has a constantly rotating drum. It is suggested that this drum could be mounted on a carrier. The carrier would have to stop at each print position in order to give the rotating drum time to rotate to the desired character.

The Cahill U.S. Pat. No. 3,794,150, which issued Feb. 26, 1974, discloses a drum printer which includes an incrementing carrier. The carrier stops at each print position until the drum rotates to the desired position.

Application Ser. No. 535,647 of Jensen et al, filed Dec. 23, 1974, discloses a carrier control system for a start-stop disk printer in which the carrier normally traverses at a predetermined speed. Printing always occurs at the same predetermined speed; however, if there is not sufficient time to rotate the disk to the next desired character, the carrier is slowed down between print positions and then returned to the predetermined speed.

Application Ser. No. 427,962 of Martin, filed Dec. 26, 1973, discloses a constantly rotating disk printer where the carrier is always moving at a fixed speed when printing occurs. Under certain conditions the carrier stops between print positions in order to give the disk time to rotate to the desired print position.

None of the above references show a printer where the carrier is moving at a plurality of different speeds when printing occurs and where the firing of the print hammer is timed dependent upon the speed of the carrier at the particular time.

SUMMARY OF THE INVENTION

Generally stated, it is an object of this invention to provide a printer with improved performance.

Another object of the present invention is to provide a start-stop disk printer which has improved throughput.

Another object is to provide an improved method of printing.

More specifically, it is an object of this invention to provide for controlling the speed of the carrier in accordance with the time required to position the print wheel at the desired position.

Another object of the invention is to control the speed of the carrier and to control hammer firing time with respect to carrier speed.

Another object of this invention is to control carrier speed in such a way that proportionally-spaced printing can be done with a high throughput speed.

The present invention provides a start-stop disk printer which has one motor for controlling the disk and another motor for controlling the carrier movement. As in all mechanical systems, the mechanical characteristics of these motors and other related mechanical components impose physical limitations such as maximum speeds, maximum accelerations and maximum decelerations. The present invention is directed to maximizing the performance of the printer by controlling the carrier traverse, disk rotation, and hammer firing such that the maximum capacities of the motors and other physical components can be utilized more fully than possible in the prior art control schemes.

The novel control mechanism of this invention moves the carrier at several different speeds depending upon the particular sequence of characters being printed. The particular time the print hammer is fired is varied depending upon the speed of the carrier when the particular character is printed.

The foregoing and other objects, features and advantages of the invention will be apparent from the more particular description of a preferred embodiment of the invention as illustrated in the accompanying drawing.

DESCRIPTION OF A PREFERRED EMBODIMENT

Figure 1:
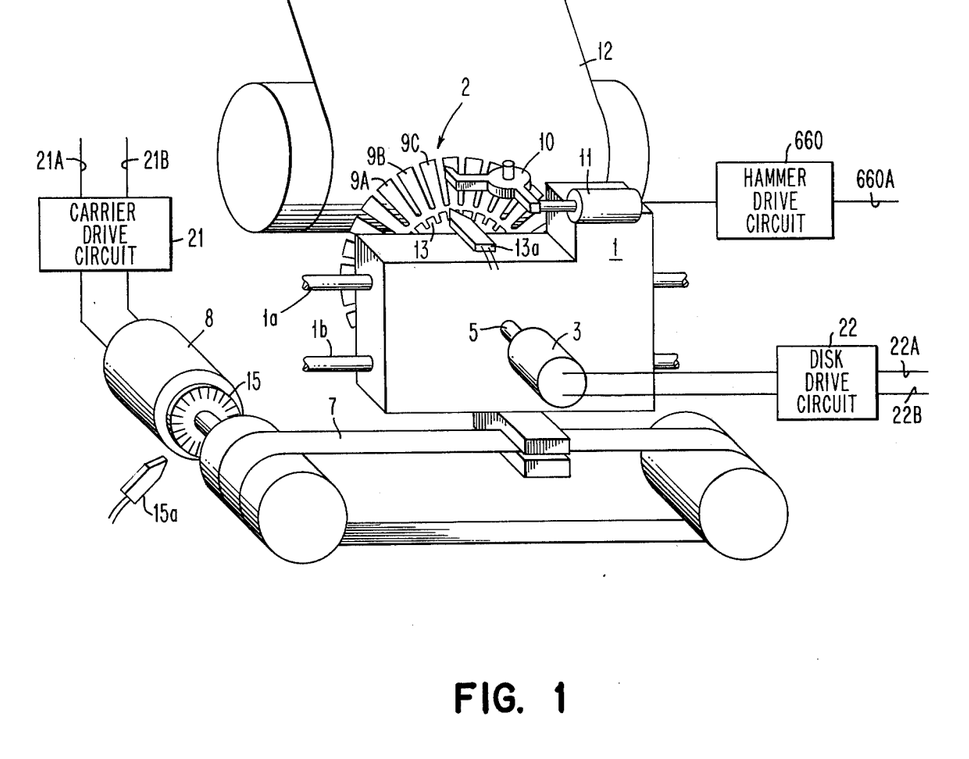
FIG. 1 shows a printer apparatus adapted for use with the present invention.

FIG. 1 shows the main mechanical components of the present printer. They are shown somewhat schematically since such components are well known and the present invention is directed to the control mechanism for the two stepper motors 3 and 8 and not to the mechanical components per se.

As shown in FIG. 1, a laterally sliding carrier 1 is mounted on guides 1a and 1b and carries a rotatable print wheel or disk 2 driven by a stepping motor 3. The carrier 1 is driven by a toothed belt 7 which is driven by a stepping motor 8 (the teeth on the belt are not shown). Alternatively, motor 8 could drive a lead screw which in turn could drive carrier 1.

The type disk 2 comprises a disk having a number of movable type elements such as the flexible spokes or type fingers 9A, 9B, 9C, etc. Printing of any desired character is brought about by operating a print hammer 10, which is actuated by a solenoid 11, both of which are mounted on the carrier 1. When the appropriate type finger approaches the print position, the solenoid 11 actuates the hammer 10 into contact with the type finger, driving it into contact with the paper 12. An emitter wheel 13 attached to and rotating with the type disk 2 cooperates with a magnetic sensor 13a to produce a stream of emitter index pulses for controlling the operation of the printer. The emitter has a series of teeth each of which corresponds to one finger 9A, 9B, 9C, etc. A home pulse is generated for each revolution of the print wheel by a single tooth on another emitter (not shown). The printer controls can thus determine the angular position of the type disk 2 at any time by counting the pulses received since the last line pulse. A toothed emitter 15 is mounted on the shaft of the motor 8 and in conjunction with a transducer 15a provides pulses which indicate the position of the carrier 1.

Stepper motors 3 and 8 are activated by conventional drive circuits 21 and 22. Examples of the type of drive circuitry that could be used are shown in U.S. Pat. No. 3,636,429.

The actions of positioning the carrier 1 and positioning the print wheel 2 are, in general, independent except that coordination is required at the instant printing occurs. Both the type disk 2 and the carrier 1 must be in a selected position (but they need not be at rest) when the hammer 10 strikes the type disk 2. Due to the amount of inertia involved, it is often possible to reposition the type disk 2 more quickly than the carrier 1. Therefore, it is the repositioning time of the carrier which primarily limits the speed of printing.

Figure 2A:
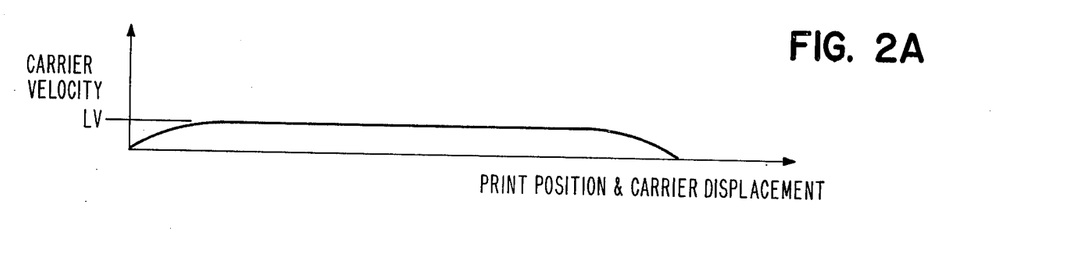
FIGS. 2A and 2B are curves showing carrier velocity versus carrier displacement and carrier velocity versus time in one type of prior art printer.
Figure 2B:
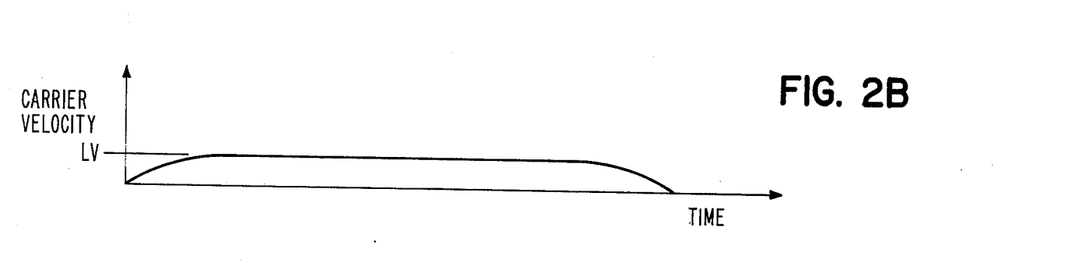

FIGS. 2A and 2B illustrate one prior art technique for controlling a start-stop disk printer wherein the speed of the carrier is constant. A constant velocity is selected such that the disk has time to rotate to any desired position in the time required for the carrier to move between character positions. It is noted that in such printers the velocity selected must be very low, herein designated LV. FIG. 2A shows the carrier velocity in this type of printer with respect to the horizontal displacement of the carrier as it traverses the various print positions. FIG. 2B shows the carrier velocity with respect to time. As shown by these figures, the carrier velocity is constant both with respect to time and with respect to carrier position.

The carrier velocity LV must be such that the time required for the carrier to move from one print position to the next is greater than the longest time required to position the disk under the worst-case conditions. This technique is reasonably satisfactory in a low speed printer or if the time needed to reposition the disk is always about the same. However, in a high performance printer with a servo or step motor driven disk, the disk repositioning time may vary over a wide range, such as 6 to 48 milliseconds, depending on the angle between successive characters. By placing frequently used characters adjacent to each other on the disk, most repositioning cycles can be completed in the short end of the range with just an occasional longer cycle for infrequently used characters or infrequent character sequences. A constant velocity carrier is not then desirable because it limits the printing speed and it does not take advantage of the fact that the disk is repositioned very quickly in most cycles.

Figure 3A:
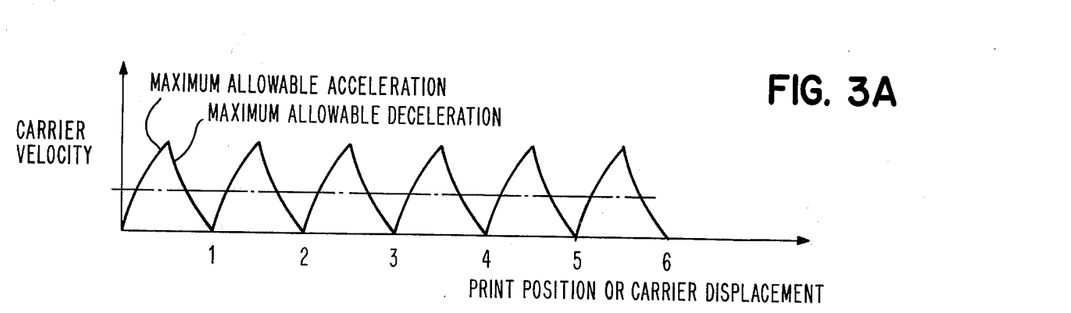
FIGS. 3A and 3B show curves of carrier velocity versus carrier displacement and carrier velocity versus time in another type of prior art device.
Figure 3B:
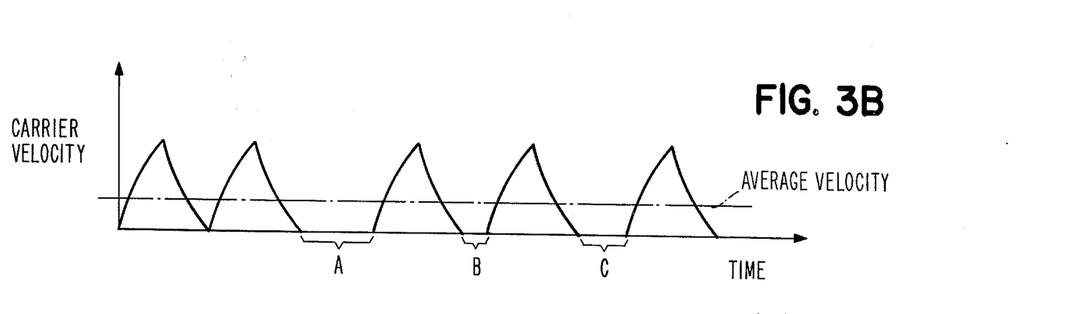

FIGS. 3A and 3B illustrate a prior art system wherein the motion of the carrier is stopped at each print position. FIG. 3A shows carrier velocity relative to carrier displacement, and FIG. 3B shows the carrier velocity relative to time. It is noted that during the time spans A, B, and C the carrier is stopped waiting for the disk to be positioned. This occurs because in this type of system the time to position the carrier is always the same, but the time to position the disk varies. Times A, B, and C would be zero only if the carrier required more time to move between positions than the longest time required to position the disk. In such a system, the carrier is accelerated at its maximum possible acceleration rate and then decelerated at a maximum possible deceleration rate between character positions. It is noted that the average velocity designated AV in FIG. 3B is relatively small. This relatively low average velocity limits the overall speed of the printer.

Figure 4:
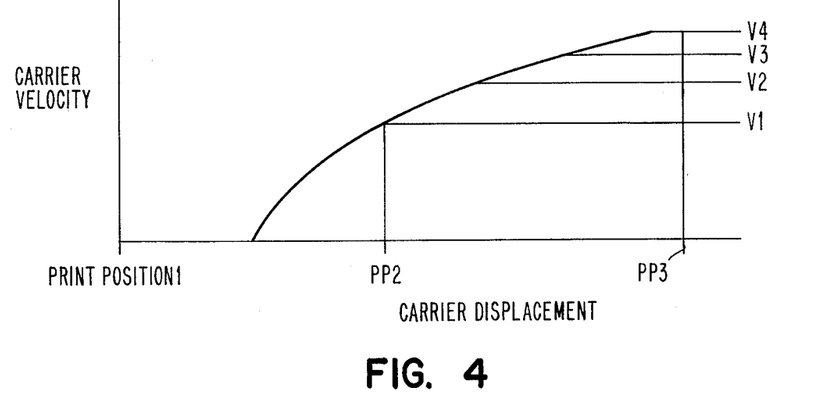
FIG. 4 shows the allowable carrier velocities when the printer is operated in accordance with the present invention.

FIG. 4 shows the allowable carrier velocities with the present invention. In the particular embodiment shown, there are four allowable velocities designated V1 to V4. These velocities are chosen so that the carrier 10 can accelerate or decelerate between any two velocities (except zero) within the space between adjacent print positions. If the carrier starts from zero velocity, it is only accelerated to V1 at the first print position. A change from V1 to 0 and back to V1 is possible in one column width.

Figure 5:
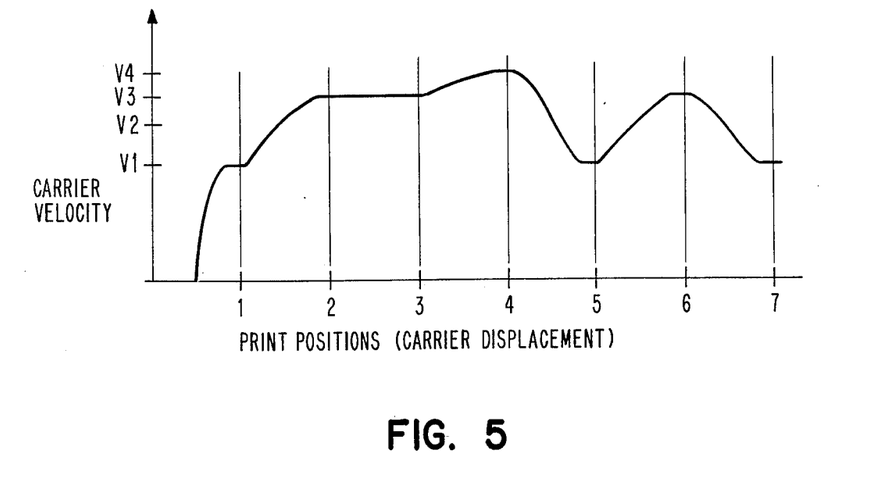
FIG. 5 shows a curve showing an example of carrier velocity versus carrier displacement when a printer is operated in accordance with the present invention.

FIG. 5 shows an example of the carrier velocity versus carrier displacement when the present invention is employed. In this example, the carrier accelerates to velocity V1 between print positions 0 amd 1, it accelerates to velocity V3 between print positions 1 and 2. The velocity remains constant between print position 2 and 3. Between print positions 3 and 4 the velocity increases to V4; between print positions 4 and 5 the velocity decreases to V1; between print positions 5 and 6 the velocity increases to V3; and between print positions 6 and 7 the velocity decreases to V1. The particular velocity at which the carrier moves between print positions is determined by a combination of two factors designated namely:

a. The number of positions which the disk must rotate in order to be positioned to print the next character.

b. The distance the carrier must move in order to print the next character. Whether or not there are any spaces between characters which are being printed determines the distance the carrier must move between characters.

Figure 7:
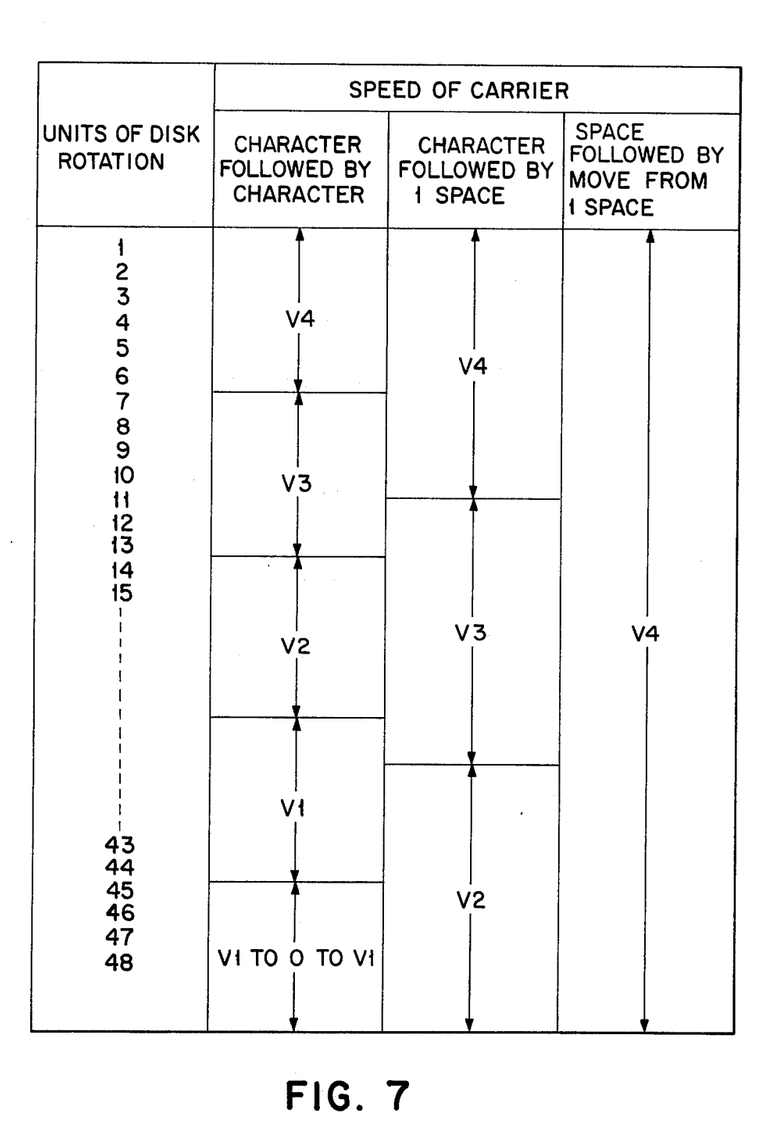
FIG. 7 is a table showing the speeds selected under various conditions and the data stored in memory table T7.

FIG. 7 shows the carrier speed which is selected under various conditions. For example, if the disk must move 12 positions, the carrier accelerates or decelerates to velocity V3. It is noted that under certain conditions where the rotation of the disk is very large (that is, between 45 and 48 positions), the speed goes from V1 to 0 and back up to V1 between print positions.

One very important aspect of the present invention is that the firing of hammer 10 must be controlled and timed dependent upon the speed at which the carrier is moving when a particular character is printed so that the flight time of the hammer and its drive circuits does not cause misalignment of the characters. In the prior art techniques, such as those illustrated in FIGS. 2A and 2B, the hammer could always be fired when the carrier was at a particular position in relation to the character being printed. For example, if six pulses of the stepper motor were required to drive the carrier between adjacent print positions, the hammer could always be fired after the fifth drive pulse.

In the prior technique illustrated in FIGS. 3A and 3B, the hammer could always be fired when both the carrier and the print disk were stopped. With the present invention, as will be seen later, the hammer firing must be controlleld dependent upon the particular speed at which the carrier is moving when a particular character is printed.

Figure 6:
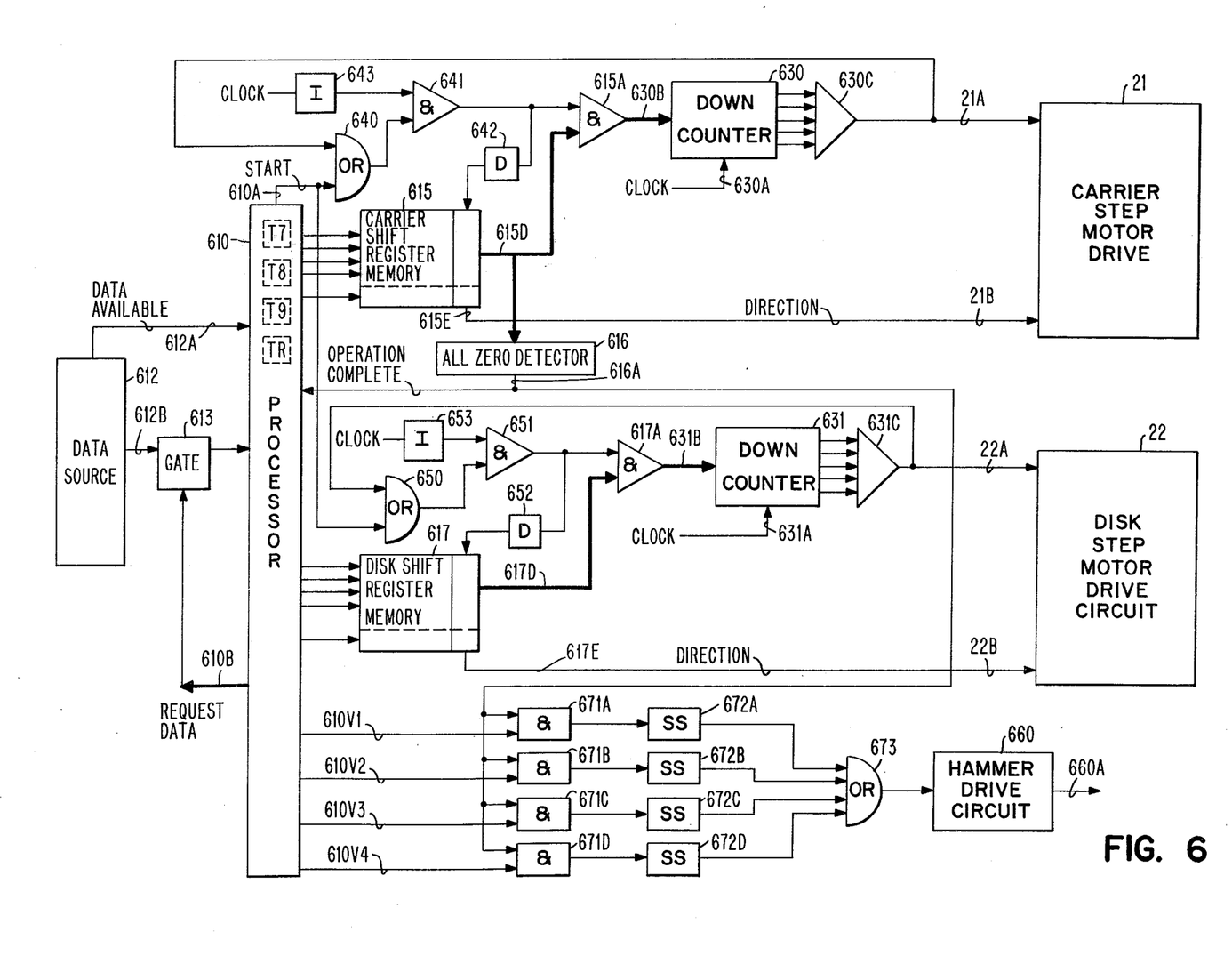
FIG. 6 is a schematic circuit diagram of the circuitry which drives the step motors in the present invention.

The circuitry which operates the components shown in FIG. 1 in accordance with the present invention is shown in FIG. 6. Stepping motor drive circuits 21 and 22, shown in FIG. 1, are activated by the circuitry shown in FIG. 6. The data which is to be printed comes from a data source 612. In response to this data, the circuitry shown in FIG. 6 generates a series of pulses on lines 21A, 21B, 22A, and 22B which activate drive circuits 21 and 22 such that stepper motors 3 and 8 move the carrier and the disk to the correct positions to print the data supplied by data source 612. The signals on lines 21B and 22B indicate the direction which the stepper motor should move. Signals on lines 21A and 22A indicate how far the motors should move. Each pulse on line 21A causes motor 8 to move one step and each pulse on line 22A causes motor 3 to move one step.

The main components of the circuitry which generates the appropriate pulses in response to the data supplied by data source 612 are: processor 610, shift register memories 615 and 617, counters 639 and 631, and zero detector 616.

men source 612 gives a series of signals on line 612B which represent characters and spaces such as "all good mem come to the aid of their country". When data is available on output 612B, line 612A is activated. If data is available on line 612B when a data request signal appears on line 610B one element of data called a "datum" is gated through gate 613 to processor 610.

Data source 612 can be a conventional data buffer or a keyboard input device such as a typewriter. Processor 610 can be a commercially available computer such as the IBM System/7. The processor 610 receives the data, makes certain calculations and then sends a series of numbers out to carrier shift register memory 615 and disk shift register memory 617. If the hammer is to be fired in a particular column, the processor 610 also activates one of the lines 610V1 to 610V4 to indicate the speed at which the carrier is being driven. These lines control the timing of the hammer firing.

The processor 610 has two tables stored in its memory. These are represented in FIG. 6 as areas T7 and T8. Processor 610 also has two data storage areas which are represented by areas T9 and TR.

The data stored in table T7 indicates the speed at which the carrier is moved under various conditions. This data is shown in FIG. 7.

The information in table T8 is the particular numbers which the processor 610 supplies to memories 615 and 617 in order to move the stepper motors 3 and 8 at particular velocities. These numbers are shown herein in FIG. 8, where the notation N1, N2, etc, represents particular timing values appropriate for various carrier speed changes and print wheel movements. Specific examples are given later.

Figure 9:
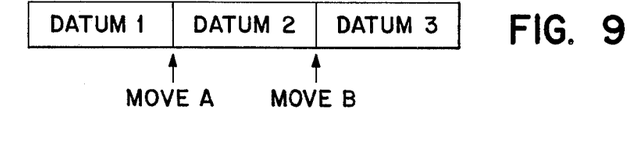
FIG. 9 is a diagram of a data string as stored in memory location T9.

Storage area T9 is a shift register storage used to store three elements of data. This is illustrated in FIG. 9. The elements of data are termed Datum 1, Datum 2, and Datum 3. Generally, Datum 1 and Datum 2, and Datum 3 indicate characters which are to be printed as follows:

Datum 1 The character in the process of being printed, i.e., the character for which commands to move the carrier and the disk, and to fire the hammer have just been given. (See below for a discussion of start up.)

Datum 2 The character to be printed after the next move of carrier and disk.

Datum 3 The character to be printed after the next two moves of the carrier and disk.

The number of spaces which the carrier must move between printing Datum 1 and printing Datum 2 is hereinafter designated move A and the number of spaces which the carrier must move between printing Datum 2 and Datum 3 is herein designated move B.

When the processor 610 interrogates data source 612 for an element of data and data source 612 does not have data available (which is indicated by the absence of a signal on line 612A) a special character is inserted into the data string which is hereinafter called a "no data" condition. The "no data" character has the following properties:

It has zero width (i.e., no carrier motion is required).
Its position on the wheel is defined as the position of the previously printed character (home position upon initial start-up).
It is never printed.

Thus, the "no data" character never calls for any action on the part of the printer except for stopping the carrier when there is no more data. Thus, the "no data "characters serve as precursors to fill the registers or memories and permit starting the printing process.

Similarly, when no more data is available, they serve as chasers and permit completion of all the printing for which the data source has asked.

With the information at the next three characters (including "no date") available, the processor 610 can decide the appropriate sequences for the motors and hammer. The manner in which this is done is described in detail later.

Storage area TR contains three storage registers hereinafter termed R0, R1, and R2. The numbers stored in these registers indicate the number of spaces between adjacent characters. This data indicates the number of print positions that the carrier must move. This data is stored for both move A and move B.

Carrier shift register memory 615 and disk shift register memory 617 are first-in first-out memories which may merely consist of a plurality of shift registers. Each memory can store up to 64 words. Each word has a plurality of bits. Each work is shifted through the memory in parallel. The bits of each word represent a number (which is translated into a time delay or a speed) and a bit indicating direction.

The circuitry shown in FIG. 6 operates as follows:

Processor 610 puts a series of numbers in memories 615 and 617. The numbers from memories 615 and 617 are gated through gates 615A and 617A to down counters 630 and 631. Down counters 630 and 631 receive a series of clock pulses on inputs 630A and 631A. The signals on lines 630A and 631A cause the counters to decrement to zero. Each counter has associated therewith a zero detector designated 630C and 631C. When a counter reaches zero count, the respective detector emits a pulse to the carrier step motor drive circuits 21 and 22. Thus, if, for example, the number "1500" is transferred into the counter 630, then after 1500 clock pulses occur, the counter reaches zero and a pulse is produced on line 21A.

In the specific example described herein, the stepper motor 8 and toothed belt 7 are such that when six pulses are applied to stepper motor 8, carrier 1 moves one print position. The system operation will be illustrated by showing how the processor 610 causes a series of six pulses to go to the carrier step motor drive circuit 21.

In order to move carrier 1 one print position, processor 610 supplies six numbers to carrier shift register memory 615. The magnitude of these numbers represents the timing of the six pulses which go to carrier step motor drive 21. These six numbers are sequentially sent to down counter 630. After each number is sent to down counter 630, a series of clock pulses decrement the counter to zero. When the counter reaches zero a pulse is generated on line 21A which moves motor 8 one step and carrier 1 one-sixth of a column width. The pulses on line 21A also go through OR circuit 640 and AND gate 641 to delay circuit 642. After a very short (e.g., ½ microsecond) time delay introduced by delay 642, another number is gated from carrier shift register memory 615 to down counter 630 and the process repeats itself.

As explained above, six numbers in memory 615 are required to generate six pulses on line 1A and to thereby move the carrier one column width. Each set of six numbers in memory 615 is separated from the preceding set of six numbers by a word which contains all zeros. A word with all zeros is placed in memory 615 by processor 610 after it places every six numbers in the memory. The all zeros seperator word is detected by circuit 616 which generates an "operation complete" signal. This causes the processor 610 to gate more information into memories 615 and 617 and it also initiates the activation of hammer drive circuit 660 as will be explained later.

The magnitude of the six numbers placed in memory 615 determine the duration between pulses that appear on line 21A and, hence, the speed of step motor 8 and carrier 1. Similarly, numbers placed in memory 617 control the motion of disk step motor 3.

Figure 8:
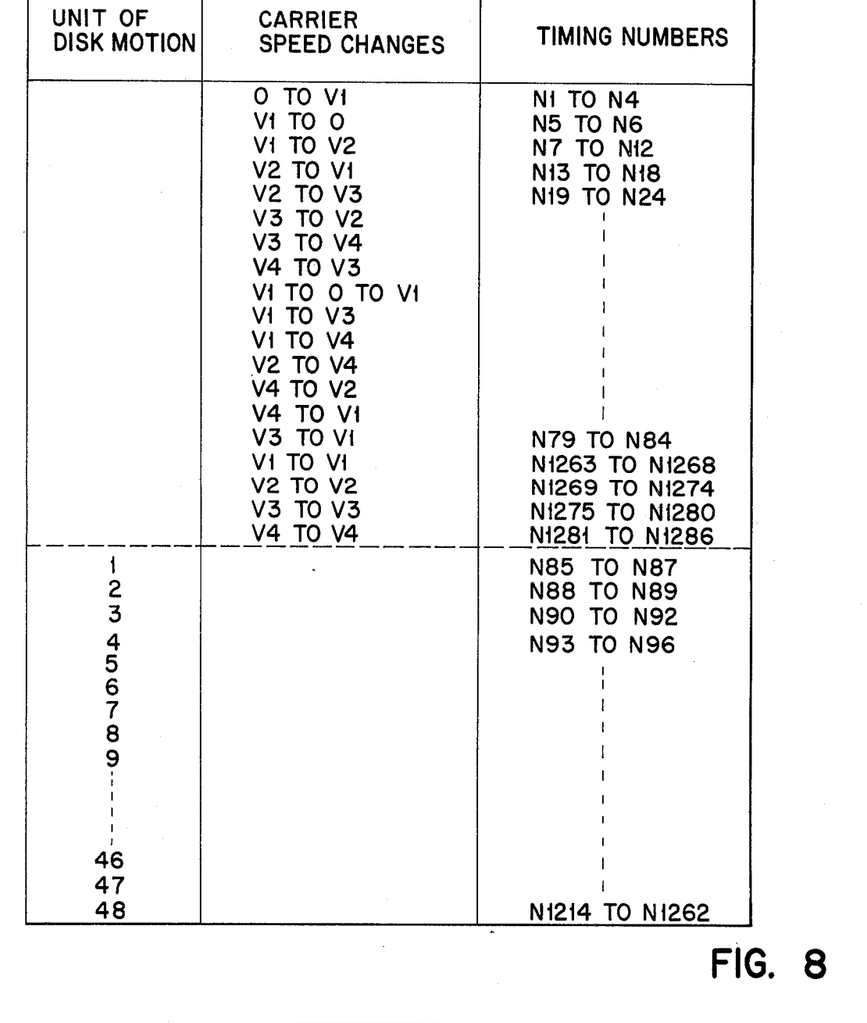
FIG. 8 is a table showing the timing words stored in memory table T8.

FIG. 8 shows that for each possible carrier speed change there is a particular series of numbers that must be placed in memory 615. For example, to change from velocity V2 to velocity V1, the numbers N13 to N18 must be placed in memory 615. The actual value of numbers N13 to N18 depends upon the characteristics of the particular circuitry and the particular motors. For example, with a conventional stepping motor and with timing signals at microsecond intervals the following numbers could be stored in the memory to change from a carrier speed of 6 inches per second to a carrier speed of zero.

2777   2777   2777   2777   5000   5000

The following numbers would be used for a constant speed of 6 inches per second 2777   2777   2777   2777   2777   2777

The following numbers would be used to change the 9 inches per second to 6 inches per second 3900   2200   0   2777   2777   2777

Similarly, an example of the actual numbers N93 to N96 placed in memory 617 to obtain a disk rotation of four units could be (each number in memory 617 moves disk 2 one unit)

1400   1130   1018   2130

In practice, the easiest way to determine the actual numbers N1 to N1286 is by trial and error. Various numbers are placed in memories 615 and 617 and the resultant velocities are measured. By trial and error, one can determine which particular number will generate a particular desired velocity profile.

Each word placed in memories 615 and 617 has a multibit number which is gated out on lines 615D and 617D, plus a direction bit which appears on outputs 615E and 617E. The bits on lines 615E and 617E control the direction of motion of the step motors.

The operation begins when a pulse appears on line 610A. The pulse on line 610A goes through OR circuit 640 and AND gate 641, through delay element 642 and it gates the first number from carrier shift register memory 615 to down counter 630. Inverter 643 receives the same clock pulses as appear on lines 630A and 631A and it produces an out-of-phase clock pulse so that the information in shift register memory 615 and 617 is not gated to down counters 630 at an inappropriate time. Logical elements 650, 651, 652 and 653 perform a similar timing and gating function to logical elements 640, 641, 642, and 643.

An important facet of this present invention is that the timing of the firing of hammer 10 is dependent upon the speed of carrier 1. Six pulses on line 21A are required to move carrier 1 between adjacent print positions. After the sixth pulse is supplied to circuit 21 counter 630 is loaded with the sixth number and the firing of the hammer is initiated by the "all zero detector" 616 on line 616A; however, a variable amount of delay is introduced by delay circuits 672A to 672D, dependent upon the speed at which the carrier is being driven. The length of each delay 671 is chosen so that the length of the delay plus the hammer flight time is equal to the time required to move the carrier one-sixth of a column width at the particular velocity.

The manner in which the hammer drive circuit 660 is activated is as follows: The signal on line 616A activates hammer drive circuit 660 through AND gates 671A to 671D, single shot delay elements 672A to 672D, and OR gate 673. If the hammer is to be fired, the processor 610 provides a signal on one of the lines 610V1 to 610V4 indicating the particular velocity at which the carrier step motor 8 is being driven. This combination of signals activates one of the single shot delay elements 672A to 672D which in turn activates hammer driver circuit 660. Thus, the hammer driver circuit 660 is activated at a particular time which is dependent upon the particular velocity at which the carrier is moving past a particular print position. The length of delay introduced is shorter if the velocity is higher.

Figure 10A:
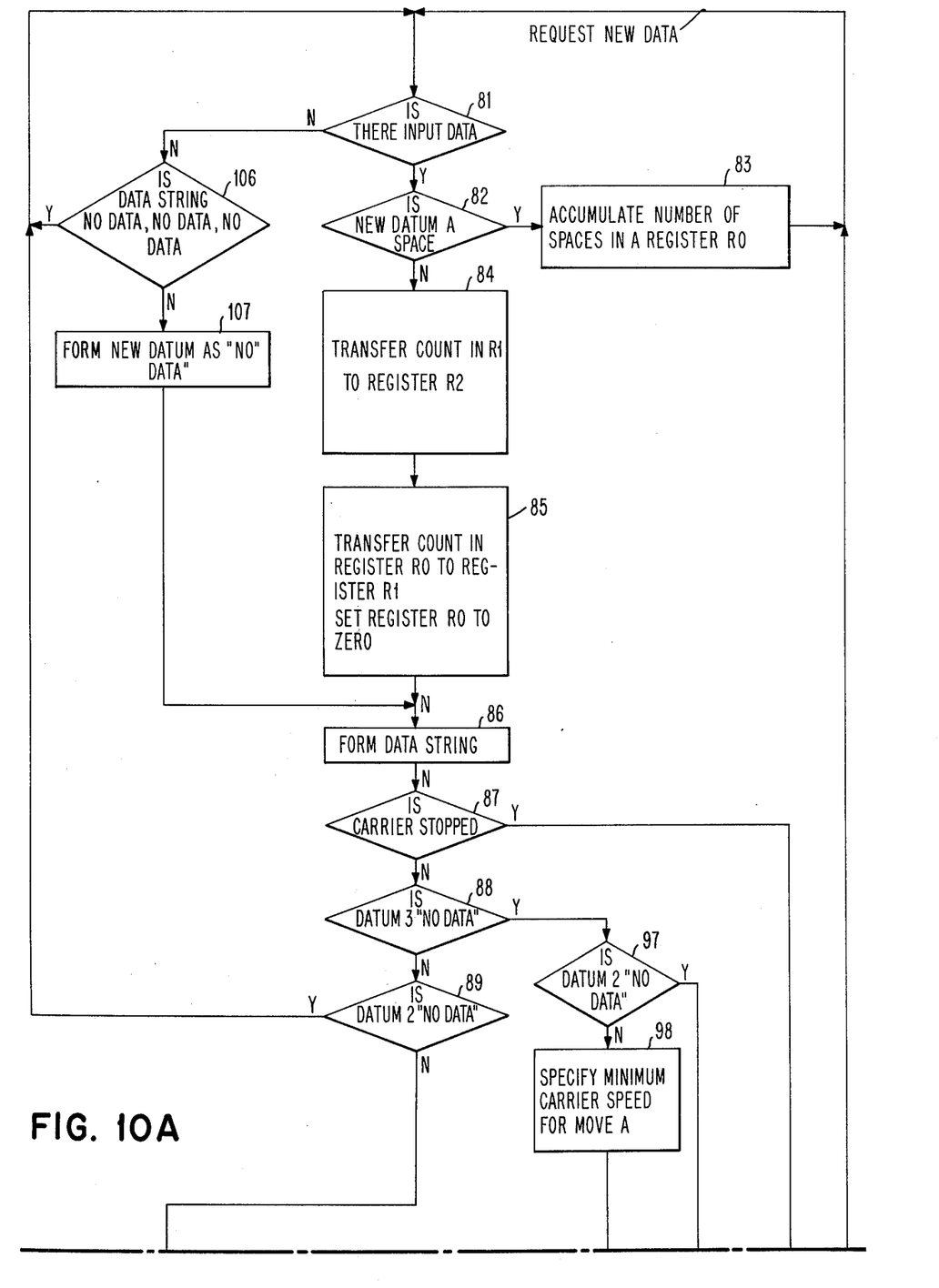
FIGS. 10A and 10B comprise a flow diagram of the program executed by the processor shown in FIG. 6.
Figure 10B:
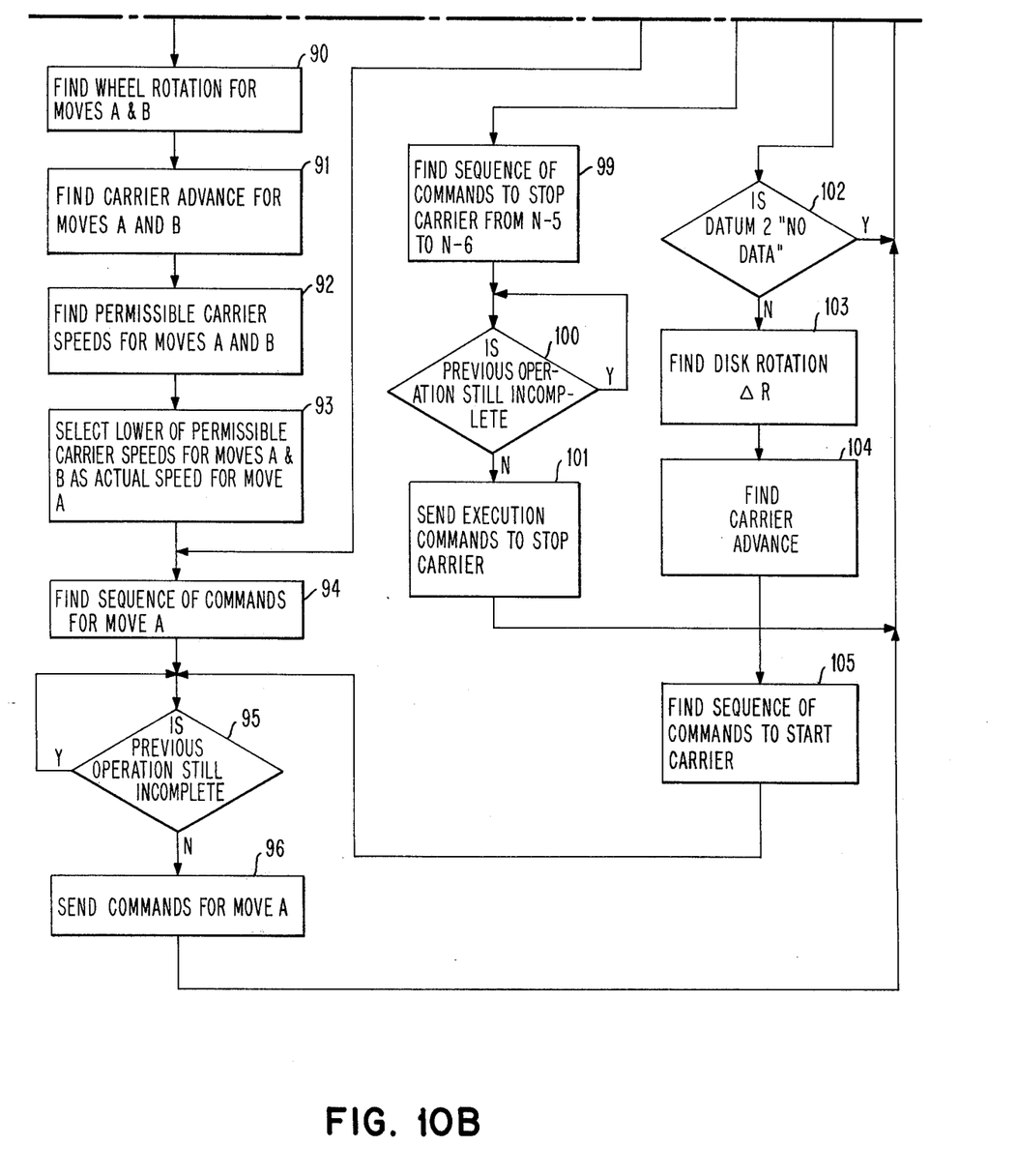

FIG. 10A and 10B is a flow diagram of the specific operations performed by processor 610. The details of the flow diagram will now be explained by explaining each block in the flow diagram.

Block 81 The processor 610 determines if the data source 612 has data available by interrogating line 612A.

Block 82 If an element of new data called a "new datum" is available, an interrogation is made to determine if it is a space.

Block 83 A count indicating the number of spaces between two adjacent characters is accumulated and recorded in register R0 in storage area TR, and new data is requested.

Block 84 When a printable character arrives after a space, the count in register R1 is transferred to register R2. This count represents a value termed S for move A.

Block 85 The count in register R0 is transferred to register R1. This count represents the value S for move B. Register R0 is set to zero after its contents are transferred to register R1.

Block 86 The new datum is inserted into the left end of the data string in storage area T9 (FIG. 9). This data string has three elements of data. The new datum is always entered at the left and each time a new datum is entered, the data presently in the register is shifted one place to the right.

Block 87 Interrogation is made to determine whether or not the carrier is stopped. If the carrier is stopped, special action must be taken.

Block 88 The third element of data in the data string is interrogated to determine if it is a "no data" condition.

Block 89 The second element of data in the data string is interrogated to determine if it is a "no data" condition. If yes, request more data.

Figure 11:
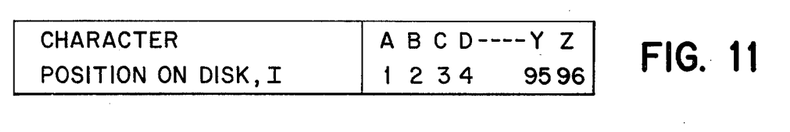
FIG. 11 shows the position of the characters on the disk.

Block 90 The amount of wheel rotation for moves A and B is calculated. This done by calculating the number of intermediate characters on the wheel. (See FIG. 11.) For example, a move from A to D is three spaces. It is noted that the disk has 96 characters. If desired, some characters could be repeated. If characters are repeated, the smallest amount of possible rotation would be chosen. Furthermore, frequently used characters could be grouped.

Block 91 The number of positions which the carrier will have to advance for moves A and B is determined by adding one to the numbers in registers R1 and R2.

Block 92 Table T6 (FIG. 7 herein) in the memory of computer 610 is interrogated to determine the carrier speeds for moves A and B.

Block 93 The actual speed for move A is selected as the lower of the permissible speeds for move A and move B. The reason the lower of the two speeds is chosen is to insure that the carrier will always be going slow enough to allow the disk motor to complete its move prior to the carrier having moved one column and to be certain the carrier can stop if that is required.

Block 94 Table T8 (FIG. 8 herein) in the memory of computer 610 is interrogated to determine the sequence of commands which need be sent to memory 615 and 617 in order to execute move A. If multiple columns are to be moved (i.e., the count in register R2 is more than one), Table T8 will be addressed more than once with the total sequence for the move being several sets of six numbers.

Block 95 Line 616A is interrogated to determine if the previous operation is complete. This interrogation is repeated until an operation complete signal is received on line 616A.

Block 96 The commands necessary (found in Block 94) to execute move A are sent by processor 610. This includes: sending six numbers to memory 615 in order to move the carrier, sending a series of numbers to memory 617 in order to move the disk, and sending a signal on the appropriate one of the hammer firing lines 616V1, 616V2, 616V3, or 616V4. Request new data.

Block 97 If Block 88 found that the third element of data in the data string was a "no data" condition, Block 97 interrogates the second element of data to determine if it also is "no data" condition.

Block 98 If the third element of data is a "no data" condition and the second element of data is not a "no data" condition, Block 98 specifies the speed for move A as being the smallest non-zero speed.

Block 99 If both the second and third elements of data are a "no data" condition the carrier must be stopped. The sequence of commands to stop the carrier is extracted from Table T8 (FIG. 8 herein).

Block 100 The system waits for a signal on line 616A to indicate that the operation is complete. No operation proceeds until this signal arrives.

Block 101 The commands necessary to stop the carrier (found in Block 99) are sent to memory 615 and new data is requested.

Block 102 If the carrier is stopped and the second element of data is a "no data" condition, more data is requested.

Blocks 103 The amount of disk rotation for move A is obtained as explained with reference to Block 90.

Block 104 One is added to the amount in register R1 to determine the amount of carrier advance.

Block 105 The sequence of commands is obtained from Table T8 in memory as in Block 94.

Block 106 (FIG. 10A) An interrogation is made of the data in data string T9 (shown herein in FIG. 9) to determine if all three datums are a "no data" condition. If they are, more data is requested.

Block 107 A new "no data" datum of information is inserted in the data strong in Table T9.

The actual program to implement the above described flow diagram on a commercially available IBM System/7 is a direct state-of-the-art translation of the above flow diagram.

Various other embodiments of the present invention are possible. For example, it is possible to design a system which has an infinite variety of speeds at which a carrier can traverse between print positions. Such a system would require more complex logic; however, it would achieve increased speed, thus presenting a cost benefit trade-off which must be made in the design.

At each print position, the sytem would calculate the desired velocity of the carrier in order to arrive at the next print position. This calculation could take into account the following parameters:

1. There is a certain maximum allowable velocity (hereinafter called CVN) due to the inherent limitations of the carrier mechanism.
2. If the carrier were to travel at a constant velocity between adjacent print positions, the CVN velocity would be different for the traverse between successive print positions because of the fact that the print wheel need rotate different amounts. In order to simplify the calculation, the system could restrict the velocity of the carrier at each print position to a velocity which is less than the CVN velocity.
3. The mechanical aspects of the carrier also dictate that there is a maximum allowable acceleration. The velocity chosen must not require more than this maximum allowable acceleration.
4. The mechanical characteristics of the carrier also impose a maximum allowable deceleration. It is important that the carrier speed at any print position be such that the carrier can, in fact, decelerate to the desired speed before the next print position.

The embodiment of the invention shown herein does not have proportional spacing. That is, the amount that the carriage moves for each character is identical to the amount moved for any other character. The present invention could also be advantageously utilized in a proportional spacing system. In a proportional spacing system, each character is considered as having a particular number of units of width. For example, the letter "W" would have seven units of width whereas the letter "i" would have three units of width. The velocity of the carrier is calculated utilizing the number of units of space which the character must move rather than the number of columns which the carrier must move. In a proportional spacing system, the logic would determine the number of units which the carrier must move to print a particular datum. Depending upon the particular series of datums which are to be printed and whether or not there are any spaces between these datums, particular velocities would be chosen.

Other embodiments of this invention are also possible. However, they would all involve the fundamental principle that the hammer firing must be timed in relationship to the particular velocity which the carrier is moving when a particular character is printed.

One method of timing the hammer firing is shown herein. Other equivalent methods could also be utilized. For example, one could have another counter which is counted to zero in a manner similar to counter 630 and 631. The processor would insert a number in this counter depending upon when the hammer should be fired for the particular carrier velocity at which a character is printed. Other alternate equivalent means of timing the hammer in relation to the carrier speed are also possible.

As shown herein the carrier moves at four speeds. A system using more or less speeds could be utilized. One could also use a continuously variable range of speeds; however, this would complicate correct firing of the print hammer. A system with continuously variable speeds would have to use a counter which is loaded with a number and counted to zero to time hammer firing.

As shown herein, the carrier is moving at one of several possible velocities when each character is printed. However, one of the allowable velocities could be zero.

The term "hammer flight time" is used herein to mean the length of time between when the beginning of the hammer fire signal appears and when the type hits the paper.

It is noted that in FIG. 8, for all units of disk rotation other than one there are as many timing numbers as there are units of rotation required because one timing number causes one unit of rotation. For example, for 4 units of rotation, numbers N93 to N96 are used. However, if only one unit of rotation is desired, three timing numbers N85 to N87 are used. These numbers could be 140F 2000R 2000F where F and R indicate the direction bits. With these numbers, one gets a forward pulse, a reverse pulse, and a forward pulse, the net of which is one step forward.

While the invention has been particularly shown and described with reference to a preferred embodiment thereof, it will be understood by those skilled in the art that various changes in form and details may be made therein without departing from the spirit and scope of the invention.

We claim:

1. In a printer for printing at a plurality of print positions along a print line on a document the combination of, a carrier, a carrier drive motor for moving said carrier across said print line past said print positions, a rotatable type element mounted on said carrier, a print hammer mounted on said carrier operable to impact said type element when a selected character is positioned at a print position, type element drive means for intermittently rotating said type element a variable distance from one character print position to another character print position, the length of time required to move between any two particular character positions being dependent on the particular location of the particular characters on the type element, carrier speed determining means for generating a signal which is a function of the length of time required to rotate said type element from one particular character positon to another selected character position, carrier drive means for selectively actuating said carrier drive motor to drive said carrier past a particular print position at a selected one of a plurality of different predetermined speeds in response to said speed determining means, and means for actuating said print hammer at a time which is dependent upon the speed of said carrier.

2. The method of operating a printer, said printer having, a carrier movable by a carrier drive motor past a plurality of print positions along a print line of a document, a rotatable print element mounted on said carrier,
said print element having a plurality of type bearing elements for printing a plurality of different characters on said document,
a hammer for striking said print element,
said print element being intermittently rotatable for selectively positioning various desired type bearing elements at successive print positions,
said method comprising the steps of, calculating the amount of rotation required to position said type element to print a selected character,
actuating said carrier drive motor to drive said carrier past said print position at a velocity which is dependent upon the amount of rotation of said print element between successive print positions, and
actuating said hammer after a particular time delay which is dependent upon the velocity at which said carrier is moving when said hammer strikes said print element.

* * * * *